July 2, 1940.  P. E. MERCIER  2,206,418
COOLING ARRANGEMENT FOR AIR-COOLED AIRCRAFT ENGINES
Filed Oct. 16, 1937  4 Sheets-Sheet 1
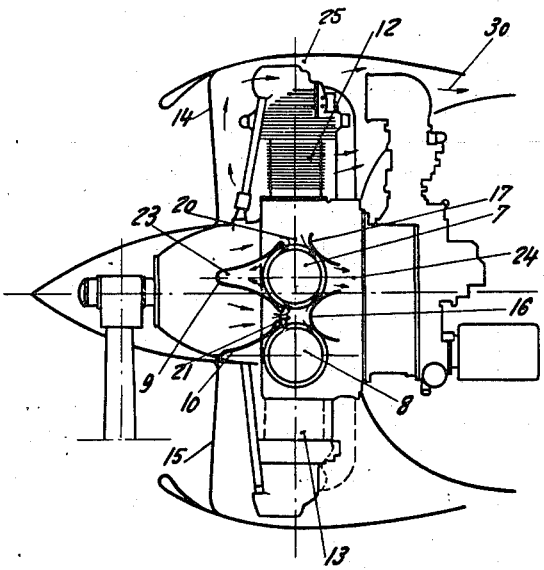
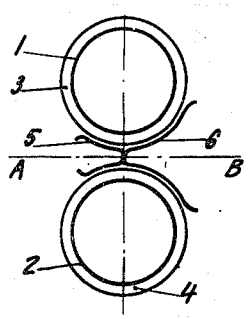
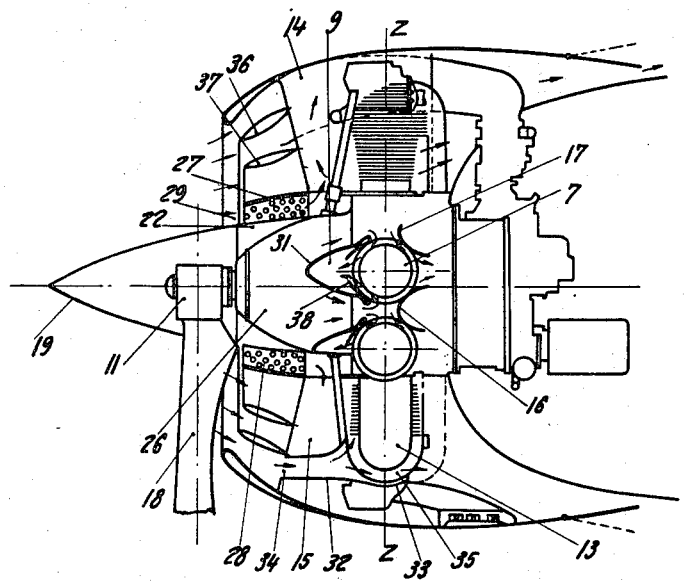
PIERRE ERNEST MERCIER
INVENTOR
BY: Haseltine Lake & Co.
ATTORNEYS

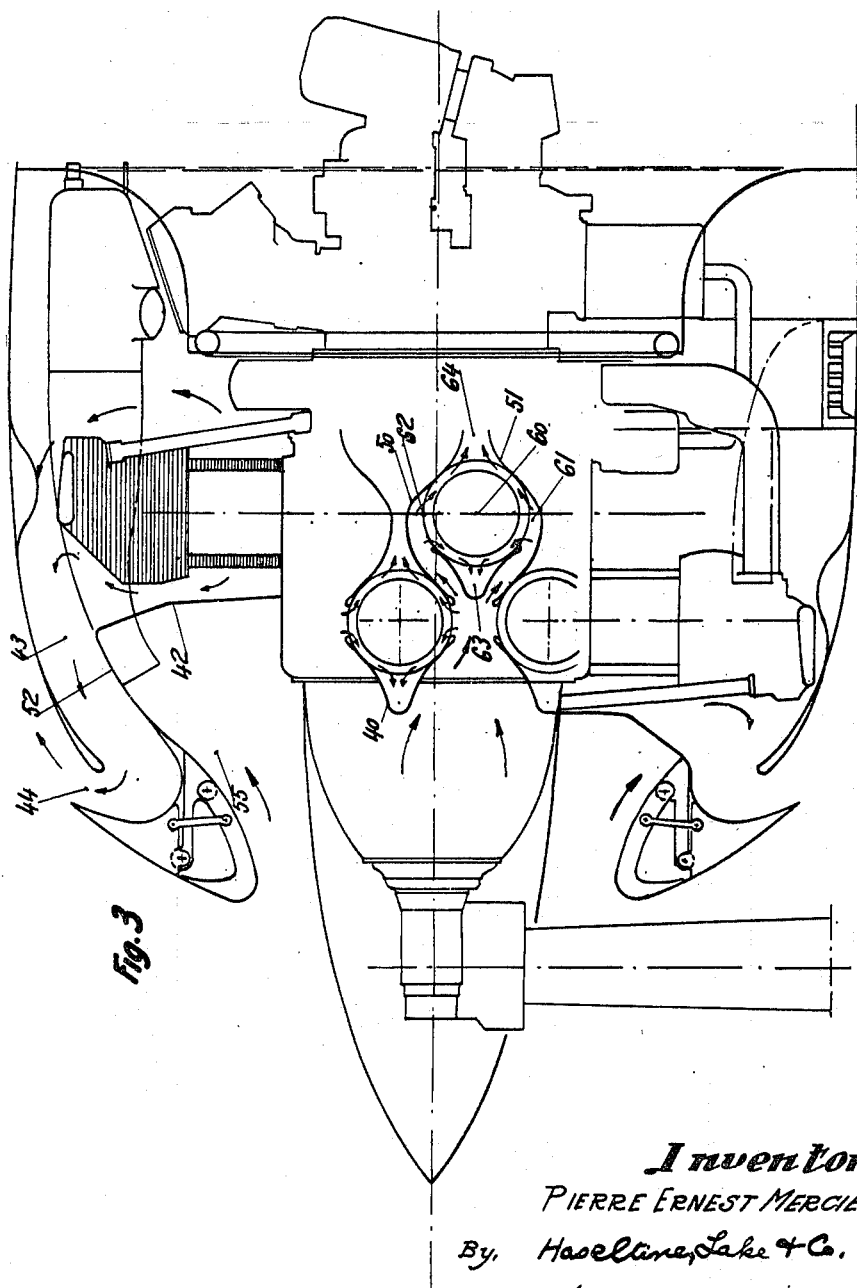

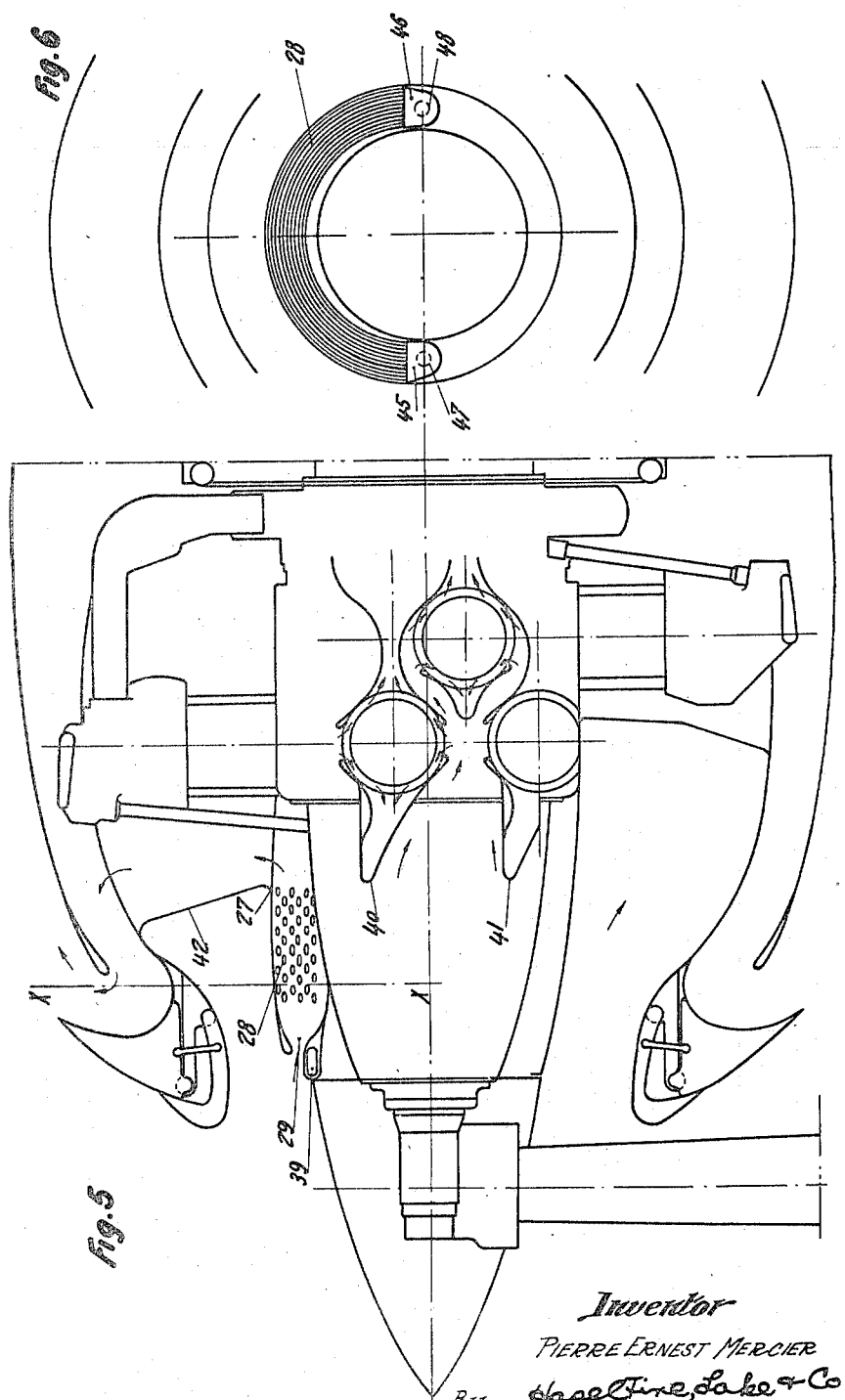

July 2, 1940.  P. E. MERCIER  2,206,418

COOLING ARRANGEMENT FOR AIR-COOLED AIRCRAFT ENGINES

Filed Oct. 16, 1937   4 Sheets-Sheet 4

PIERRE ERNEST MERCIER
INVENTOR

By: Haseltine, Lake & Co.
ATTORNEYS.

Patented July 2, 1940

2,206,418

UNITED STATES PATENT OFFICE 2,206,418

COOLING ARRANGEMENT FOR AIR-COOLED AIRCRAFT ENGINES

Pierre Ernest Mercier, Paris, France

Application October 16, 1937, Serial No. 169,400
In France March 10, 1937

6 Claims. (Cl. 123—171)

This invention relates to cooling arrangements for air-cooled aircraft engines.

The main object of the present invention is to improve the circulation conditions of the current of the cooling air on the cylinders of airplane motors which are provided with deflectors, and particularly to insure that said air current is guided along the surfaces of said deflectors from the time it enters the cowling of the motor until it leaves. For this purpose one cylinder at least is provided with at least one rear deflector and one front deflector, the latter, facing the air current, being convex. Said air current is at first directed onto the exterior surface of the convex deflector, then passes laterally into the ribs through slots provided between the edges of the front deflector and the rear deflector or deflectors, is then directed by the internal surfaces of said deflectors which partially wind around the cylinders, and is finally discharged by flues formed by hollow spaces defined by the internal surfaces of the deflectors which progressively recede from the cylinders.

Several arrangements, each according to the invention (except in Fig. 1) are shown somewhat diagrammatically and by way of example, in the accompanying drawings in which:

Figure 1 shows the usual arrangement of the deflectors,

Figure 2 shows one arrangement according to the invention, as applied to a normal cowling, Figure 3 is an arrangement, according to the invention, applied to a special cowling with return of the heated air, Figure 4 illustrates a further arrangement with improved guiding of the air at admission and including advantageous features of the invention for cooling the oil radiator, as applied to an ordinary cowling, Figures 5 and 6 show details of the arrangement of the oil radiator in the application to a special cowling with return of the heated air, and Figures 7 to 10 illustrate an application of the invention to an engine with four cylinders in line but inverted.

Thus Figure 7 shows in side view and section the engine and the principal parts of the cooling circuit.

Figure 10:
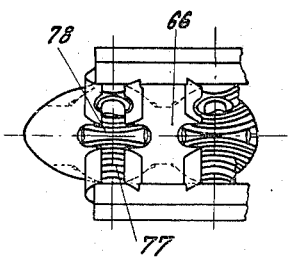

Finally, Figure 10 shows a view from the bottom of two cylinder heads with their special deflectors.

Figure 1 shows the usual arrangement of deflectors 5 and 6 which constitute screens between a space A under pressure and a space B under relative depression or suction, and which partially surround two adjacent engine cylinders 1 and 2, the gills of which are shown at 3 and 4.

This usual arrangement is open to the disadvantage that it is liable to cause a loss of charge, which loss is all the greater the finer the gills are and the greater is the necessary supply of air.

The present invention has for its object, with a given degree of cooling or for the same quantity of air, to reduce the loss of pressure involved by circulation, or to increase this circulation with constant loss of pressure.

Figure 2 illustrates the application of the invention to an engine having the cylinders arranged in simple star, surrounded by a usual cowling, the engine being shown in section through a plane parallel with and to one side of its axis. To simplify the figure, only four of the cylinders are shown, namely two, 7 and 8, in section, and the two others 12 and 13, in side view.

Each of the cylinders in Figure 2 comprises a double system of front and rear deflectors in the form of flues. The front deflectors or flues appear respectively in section at 9, 10 for the cylinders 7 and 8, and in side view at 14, 15 for the cylinders 12 and 13. The rear deflectors or flues are only shown in partial section at 16, 17 for cylinders 7 and 8, and are simple screens.

The cooling air enters under pressure at 20 and 21, as indicated by the arrows, being divided for each cylinder into four flat streams or sheets which pass round the cylinder and mix in pairs in zones such as 23 and 24. The flue formed by a front deflector, such as 14, communicates at the top, by a conduit 25 adapted for example to lie between the valve rocker boxes and optionally provided with gills, with the portion of the cowling under suction, thus ensuring the evacuation of the cooling air at 30.

A system of gills, which is arranged at the top of the cylinder head and permits an increased cooling, includes high gills spaced apart and extending in the direction of circulation of the currents of air.

Figure 3 shows the application of the invention to an improved cowling with return air flow, for a double star engine. The front deflectors 40 (seen in section) or 42 (shown in side view) communicate with an annular return conduit 43 which communicates with the outside through an adjustable slot 44. The rear deflectors 50, 51 (seen in section) have a more complicated form and are common to two adjacent cylinders of two stars respectively. Towards the top a metal plate 52 constituting the inner wall of the annular return conduit 43, is extended between the front and rear deflectors so as to prevent direct flow of the cooling air from the air admission chamber 55 under pressure to the annular outlet conduit 43.

As in the construction described with reference to Figure 2, a system of gills is preferably provided at the top of the cylinder heads, and so arranged that there is presented to the cooling air currents, comparatively high gills which are spaced apart so as only to cause a slight loss of pressure, but are very effective owing to the speed and to the quantity of air flowing in the zone where they are located.

At the level of the front and rear cylinders the fresh air is thus admitted into two distinct regions for each cylinder, for example, in the case of the cylinder 60, at 61 and 62, while it is discharged at 63 and 64.

The cooling air is thus divided up into four streams for each cylinder.

For a given output the velocity of each air stream or sheet is thus one half of that which would correspond to the usual arrangement since the travel of each stream is much reduced so that the period of contact of each particle of cooling air is only slightly altered and the cooling effect is much the same but the loss of pressure is reduced. If, however, it is desired to maintain a constant loss of pressure it is easy to see that an increased output will be obtained owing to the shortening of the route of the currents of air and the multiplication of the air passages. In this case the cooling effect will be increased.

This method of utilisation of the cooling air in two cooling stages as provided above is very advantageous from the point of view of the thermal output of the interior circulation of the cowling, but necessitates large dimensions of the gill systems suitably adapted to the conditions of use of the cowling (speed of translation with respect to the air and calories to be dissipated per unit of time). If these conditions are not obtained it may be necessary to admit at certain points of the engine, for example at the level of the gills at the top of the cylinder heads, a certain proportion of fresh air. To this end, according to a further feature of the present invention, there may also be provided a sleeve or a system of conduits passing through the deflector screens in the form of a flue and permitting the circulation of four or more air streams in parallel at the level of the cylinders and of the bases of the cylinder heads, and the use of direct cooling with simple circulation limited to a particular region of the cylinder heads, for example, to the level of the system of gills lying between the rocker boxes.

It is clear that such direct air delivery sleeves or conduits when combined with the deflector screens and flues, may be used in the case of normal cowlings with general circulation from the front to the rear and also with improved cowlings having an air return flow or circulation from the rear towards the front.

The features of the present invention may be used if necessary with an oil radiator concentric with the engine, having cooling air led to the same through flue deflector screens.

In this case the radiator or the equivalent tubular groups will be arranged around the reducing gear or the front casing of the engine preferably in a semi-circle in order to facilitate dismantling of the said elements, which dismantling would be rendered inconvenient if the radiating elements completely surrounded the front casing of the engine. The air circulating in the radiator is admitted by a pipe opening behind the air screw, whilst it is evacuated at the rear of the radiator utilising the flues constituted by the front deflectors previously described. There is consequently available, to ensure the circulation of the air through the radiator, the same pressure drop which ensures the circulation of the cooling air of the engine through its gill system.

According to an improved embodiment, the amount of air circulating in the radiator may be adjusted as desired by a suitable throttling of the air admission opening leading to the channel for supplying the radiator.

Finally the regulating action of the screens in the form of flues may be reinforced and very considerably improved by the use of gills or blades centered on the axis of revolution of the cowling.

The section through a diametrical plane of these gills shows a form of profile of the gill or blading of turbines adapted to the direction and velocities assigned to the air currents. Each blade has a form obtained geometrically by the rotation of one of these diametrical profiles about the axis of revolution in the case of a blade of revolution of toroid form, or, to facilitate its construction, each blade may be constituted by a series of rectilinear segments defining a solid polygon centred on the axis of the cowling.

It is clear that if the use of such blade systems is particularly indicated in the case of an improved circulation according to the invention, its application in the case of any other circulation, in particular of a normal circulation of two streams, may produce satisfactory results without departing from the scope of the invention.

Figure 4 shows, by way of example, this feature as applied to a simple star engine provided with a normal cowling with general circulation from the front towards the rear. A three-bladed screw is represented by its hub 11 and by the root of one of its blades 18. The propeller hub 11 is hooded by a spinner cap 19 which is followed by a fixed fairing 22, surrounding the front of the engine casing 26. The annular fairing 27 surrounds the fairing 22 and forms therewith an annular space in which is arranged an oil radiator 28 represented by a group of tubes appearing in section in the drawing. The cooling air enters at 29 and after having circulated between the tube groups of the radiator 28 opens into the front deflector screens which are in the form of flues shown in side elevation at 14 and 15 and in end view at 9. Through the flue-like interior of these screens flows a portion of the cooling air of the cylinders admitted in the radial plane ZZ (coinciding with the plane of the connecting rod system of the motor) and circulating between the gills as shown by the arrows with respect to the cylinder section 7. Each front deflector screen has, as shown at 9, a boxed outer form 31 and inner forms 38 adjacent to the corresponding engine cylinder. The screens are completed by rear deflectors 16 and 17 of conventional design. In the case of the lower vertical cylinder 13 there is shown extending through the front flue-like screen 15, a sleeve 32 terminated by a metal plate in the form of a deflector screen seen in section at 33 and compelling the air introduced at 34 into the sleeve to circulate through the cylinder head gills as shown in section at 35. Although the same arrangement is repeated for each cylinder, for the sake of clearness it is omitted in the cylinder shown in full lines uppermost in the drawing. Guide blades, appearing in section at 36 and 37, ensure good distribution of the cooling air admitted at the inlet of the cowling and distributed by the front flue-like deflector screens to the different cylinders.

Similar arrangements may also be utilised for guiding the cooling air behind the cylinders in the case of reversed circulation or when it is desired to preserve the kinetic energy of the air during the end portion of its travel.

The details of the arrangement of the oil radiator in the present combination will be better understood by reference to Figures 5 and 6 as applied, for example, to a double star engine provided with an improved return air flow cowling. In Figure 5, front deflecting screens 40, 41 and 42 communicate at their inner ends through a wall 27 with the space containing the radiator tubes 28, through which circulates the oil to be cooled. The air opening for the admission of the cooling air to the oil radiator is shown at 29, and may be throttled by the inflation of an expansible air chamber 39 which, when it is deflated, is held flattened by its natural tension on a cylindrical core, or by the action of spring blades exerting a pressure thereon. The deflectors 40 and 41 shown in Figure 5 in diagrammatic side view present an unsymmetrical aspect which can be imparted thereto with advantage to take into account the helicoidal distortion of the air admitted into the cowling after its passage at the level of the air screw. Naturally, when such an unsymmetrical arrangement of the front deflectors is adopted, it is the same for all the similar deflectors for the first row of cylinders.

Figure 6 shows the tubular group constituting the radiator 28 on the line X—X of Figure 5, the group being in the form of a horse-shoe and terminated by two collectors 45 and 46 communicating through tubes which enter at 47 and 48 (but which for the sake of clearness are not shown in the drawing) with the drain tank and the circulating pump of the engine. It is clear that the use of the front deflectors in the form of a flue, to ensure the circulation of the air at the level of a radiator arranged between the air screw and the rows of cylinders, may be carried out similarly for a normal cowling such as that which is shown in Figure 2. The advantage of grouping the oil radiator and its circulation within the cowling is evident to anyone familiar with the installing of engines on aircraft.

In its application to engines having cylinders arranged in line in several rows, as for example V engines or engines in non-staggered multiple star, the invention includes the arrangement of the delivery of fresh air on each side of each row of cylinders and not on one side only as is usual with existing engines, the heated air being collected by an evacuation conduit arranged above or below the cylinder heads according to whether the cylinders are upright or inverted. A system of deflecting screens forcing the air to travel round the cylinders passing through the gill systems in four streams is provided for as in the preceding examples, this system providing collectors for the air which has circulated round the cylinders and contributing simultaneously to the fairing of the cylinders and to the guiding of the fresh air before its admission to the level of the gills. To obtain the maximum effect of a cooling air circulation according to the invention, it is necessary to provide gills at the level of the cylinder heads, suitably disposed either to effect a cooling in two stages by utilising, for the cooling of the cylinder heads, the air which has circulated over the cylinders or by means of special gills.

Finally, an arrangement according to the invention may comprise members for regulating the circulation constituted by shutters or the like and causing adjustment, preferably simultaneously, of the admission and outlet openings for the cooling air.

According to a modification embodying the invention, a branch leads from the principal circuit of the cooling air between the air inlet and outlet openings in order to ensure cooling of the lubricating oil of the engine, and presents the advantage of automatically ensuring, apart from the starting periods, the regulation of the cooling circuit of the lubricating oil. When the regulation of the air cooling circulation of the engine has been effected, this latter regulation is adapted to be obtained automatically by means of thermostats controlling, directly or indirectly, the mechanisms manipulating the shutters which control the circulation of the cooling air.

By way of example and to enable the invention to be better understood, the application of the above principles to the case of an engine with four cylinders in line and inverted is shown.

Figure 7:
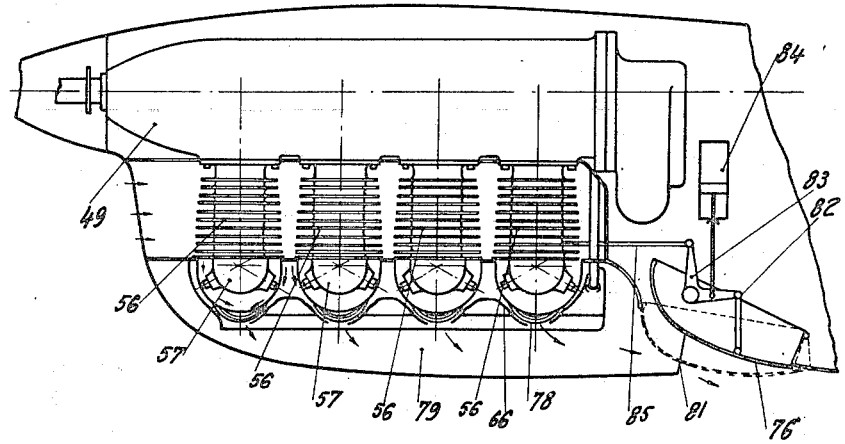
Figure 8:
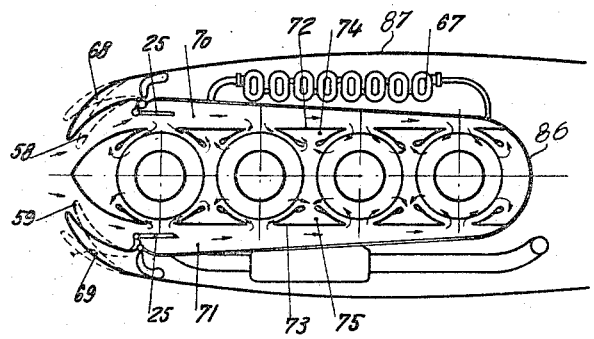
Figure 8 is a section of the same circuit in a plane perpendicular to the axis of the cylinders and intersecting these at their centre.
Figure 9:
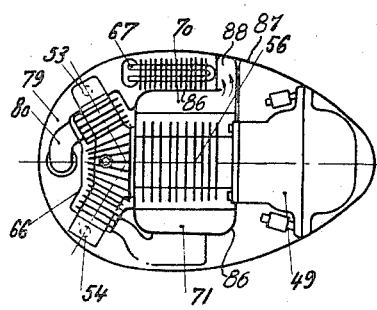
Figure 9 is a section perpendicular to the axis of the engine btween two cylinders.

The engine of Figs. 7 to 10 is assumed to have overhead valves controlled by an independent cam shaft, the axes of which are shown at 53 and 54 in Figure 9.

The engine casing is indicated at 49, the cylinders at 56 and the cylinder heads at 57, the air being admitted at the front of the engine at the level of the two slots shown in Figure 8 at 58 and 59. The effective opening of the inlet slots is controlled by movable shutters 68 and 69. Following on the slots 58 and 59, the admission conduits are shown at 70 and 71.

Between the cylinders, deflector screens 72 and 73 for the same form flues 74 and 75 through which the air flows after having cooled the cylinder gills.

Cylinder head screens 66, (Figures 7, 9 and 10) cause the air collected in the flues 75 to emerge, after having travelled through the cylinder head gills, at the level of the outlet slots 77 and 78 passing into the evacuation conduit 79 in which are arranged exhaust members 80, which are thus automatically cooled.

The conduit 79 terminates at the outlet slot 81 regulated by a rear shutter 76 hinged at 82 to the rear fairing of the engine and controlled by a bell-crank lever 83 or by a hydraulic piston 84.

Two connecting rods indicated by 85 and partially shown on Figure 8, connect the shutters 58 and 59 to the rear shutter 76. It should be noted that the piston 84 in Fig. 7 is of course the only means of control of the shutter 76, the lever 83 not being intended for manual control, but only for transmitting motion to the front shutters 68 and 69.

The heat exchanger device in which the lubricating oil circulates is shown diagrammatically at 67 in Figures 8 and 9.

This device is placed between the external wall of the cowling 87 and the interior portion 86 surrounding the cylinders and defining the conduits 70 and 71. In the conduit 70 an air trap 88 is provided, which establishes communication between said conduit and the space containing the device 67. Accordingly, a portion of cooling air circulates from the conduit 70 across the trap 88 and the device 67, to escape into the evacuation pipe.

An auxiliary shutter, omitted for the sake of simplicity, may also allow of adjusting the circulation of the cooling air for the radiator to that of the engine according to the respective temperatures of the oil and of the cylinder gills.

What I claim as my invention and desire to secure by Letters Patent of the United States is:

1. Aviation motor comprising a cowling having an air inlet section and an air outlet section between which a current of air is produced when the airplane is in motion, cylinders provided with ribs arranged in the path of said current of air, a first system of deflectors disposed between each of said cylinders and the air inlet section, at least one of said deflectors having a convex profile directed toward said current of air so as to divide the latter into two sheets of air the inner surface of said deflectors receding progressively from said ribs to form an evacuating flue for the cooling air, a second system of deflectors disposed adjacent to the cylinders and having edges disposed respectively adjacent to the edges of the deflectors of the first system so as to form two free slots located on each side of the respective cylinder through which said sheets of air penetrate respectively to the ribs according to two distinct generatrices of each cylinder and thereupon subdivide each into two half-sheets that are guided respectively by those surfaces of the deflectors of the first and of the second system that are turned toward the cylinder means including a junction formed by a continuous surface portion disposed between the surface of a deflector on one cylinder and the surface of another deflector on an adjacent cylinder for preventing cooling air from passing directly from the inlet to the outlet between mutually adjacent cylinders, and intercommunicating channel portions disposed between said deflector inner surface spaces and the air outlet section of the cowling.

2. Aviation motor comprising a cowling having an air inlet section and an air outlet section between which a current of air is produced when the airplane is in motion, cylinders provided with ribs arranged in the path of said current of air and having heads likewise provided with ribs, a first system of deflectors disposed between each of said cylinders and the air inlet section, at least one of said reflectors having a convex profile directed toward said current of air so as to divide the latter into two sheets of air the inner surface of said deflectors receding progressively from said ribs to form an evacuating flue for the cooling air, a second system of deflectors disposed adjacent to the cylinders and having edges disposed respectively adjacent to the edges of the deflectors of the first system so as to form two free slots located on each side of the respective cylinder through which said sheets of air penetrate respectively to the ribs according to two distinct generatrices of each cylinder and thereupon subdivide each into two half sheets that are guided respectively by those surfaces of the deflectors of the first and of the second system that are turned toward the cylinder means including a junction formed by a continuous surface portion disposed between the surface of a deflector on one cylinder and the surface of another deflector on an adjacent cylinder for preventing cooling air from passing directly from the inlet to the outlet between mutually adjacent cylinders, and intercommunicating channel portions disposed between said deflector inner surface spaces and the air outlet section of the cowling and surrounding said cylinder heads.

3. Aviation motor comprising a cowling having an air inlet section and an air outlet section between which a current of air is produced when the airplane is in motion, cylinders provided with ribs arranged in the path of said current of air and having heads likewise provided with ribs, a first system of deflectors disposed between each of said cylinders and the air inlet section, at least one of said deflectors having a convex profile directed toward said current of air so as to divide the latter into two sheets of air the inner surface of said deflectors receding progressively from said ribs to form an evacuating flue for the cooling air, a second system of deflectors disposed adjacent to the cylinders and having edges disposed respectively adjacent to the edges of the deflectors of the first system so as to form two free slots located on each side of the respective cylinder through which said sheets of air penetrate respectively to the ribs according to two distinct generatrices of each cylinder and thereupon subdivide each into two half-sheets that are guided respectively by those surfaces of the deflectors of the first and of the second system that are turned toward the cylinder means including a junction formed by a continuous surface portion disposed between the surface of a deflector on one cylinder and the surface of another deflector on an adjacent cylinder for preventing cooling air from passing directly from the inlet to the outlet between mutually adjacent cylinders, intercommunicating channel portions disposed between said deflector inner surface spaces and the air outlet section of the cowling, separate channel portions traversing the deflectors of the first system and producing an intercommunication between the air inlet section and the space surrounding said cylinder heads, and intercommunicating channel portions between said space and the air outlet section of the cowling.

4. Aviation motor comprising a cowling having an air inlet section and an air outlet section between which a current of air is produced when the airplane is in motion, cylinders provided with ribs arranged in the path of said current of air, a first system of deflectors disposed between each of said cylinders and the air inlet section, at least one of said deflectors having a convex profile directed toward said current of air so as to divide the latter into two sheets the inner surface of said deflectors receding progressively from said ribs to form an evacuating flue for the cooling air, the transverse section of said deflector being asymmetrical in relation to the direction of the current of air, a second system of deflectors disposed adjacent to the cylinders and having edges disposed respectively adjacent to the edges of the deflectors of the first system so as to form two free slots located on each side of the respective cylinder through which said sheets penetrate respectively to the ribs according to two distinct generatrices of each cylinder and thereupon subdivide each into two half-sheets that are guided respectively by those surfaces of the deflectors of the first and of the second system that are turned toward the cylinder means including a junction formed by a continuous surface portion disposed between the surface of a deflector on one cylinder and the surface of another deflector on an adjacent cylinder for preventing cooling air from passing directly from the inlet to the outlet between mutually adjacent cylinders, and intercommunicating channel portions disposed between said deflector inner surface spaces and the air outlet section of the cowling.

5. Aviation motor comprising a cowling having an air inlet section and an air outlet section between which a current of air is produced when the airplane is in motion, cylinders provided with ribs arranged in the path of said current of air, a first system of deflectors disposed between each of said cylinders and the air inlet section, at least one of said deflectors having a convex profile directed toward said current of air so as to divide the latter into two sheets of air the inner surface of said deflectors receding progressively from said ribs to form an evacuating flue for the cooling air, a second system of deflectors disposed adjacent to the cylinders and having edges disposed respectively adjacent to the edges of the deflectors of the first system so as to form two free slots located on each side of the respective cylinder through which said sheets of air penetrate respectively to the ribs according to two distinct generatrices of each cylinder and thereupon subdivide each into two half-sheets that are guided respectively by those surfaces of the deflectors of the first and of the second system that are turned toward the cylinder means including a junction formed by a continuous surface portion disposed between the surface of a deflector on one cylinder and the surface of another deflector on an adjacent cylinder for preventing cooling air from passing directly from the inlet to the outlet between mutually adjacent cylinders, intercommunicating channel portions disposed between said deflector inner surface spaces and the air outlet section of the cowling, walls penetrating through the deflectors of the first system and determining a space establishing intercommunication between the air inlet section and said evacuating flues, and an accessory air cooled member of said motor located in said space so as to be cooled therein.

6. Aviation motor comprising a cowling having an air inlet section and an air outlet section between which a current of air is produced when the airplane is in motion, cylinders provided with ribs arranged in the path of said current of air, a first system of deflectors disposed between each of said cylinders and the air inlet section, at least one of said deflectors having a convex profile directed toward said current of air so as to divide the latter into two sheets of air the inner surface of said deflectors receding progressively from said ribs to form an evacuating flue for the cooling air, a second system of deflectors disposed adjacent to the cylinders and having edges disposed respectively adjacent to the edges of the deflectors of the first system so as to form two free slots located on each side of the respective cylinder through which said sheets of air penetrate respectively to the ribs according to two distinct generatrices of each cylinder and thereupon subdivide each into two half-sheets that are guided respectively by those surfaces of the deflectors of the first and of the second system that are turned toward the cylinder means including a junction formed by a continuous surface portion disposed between the surface of a deflector on one cylinder and the surface of another deflector on an adjacent cylinder for preventing cooling air from passing directly from the inlet to the outlet between mutually adjacent cylinders, intercommunicating channel portions disposed between said deflector inner surface spaces and the air outlet section of the cowling, a branch channel having the air inlet thereof opening into the space between the air inlet section and the first system of deflectors and the air outlet section thereof opening into said intercommunicating channel portions, and an accessory air cooled member of said motor located in said branch channel so as to be cooled therein.

PIERRE ERNEST MERCIER.